United States Patent
Yura et al.

(10) Patent No.: US 9,870,216 B2
(45) Date of Patent: Jan. 16, 2018

(54) APPLICATION PROVIDING METHOD INCLUDING EXTRACTING AND CONVERTING PACKAGED APPLICATION

(71) Applicant: FUJITSU LIMITED, Kawasaki-shi, Kanagawa (JP)

(72) Inventors: Junichi Yura, Kawasaki (JP); Masahide Noda, Kawasaki (JP); Hideto Kihara, Kawasaki (JP); Takashi Ohno, Kobe (JP); Norihiko Igarashi, Kawasaki (JP); Jun Hanagata, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/975,933

(22) Filed: Dec. 21, 2015

(65) Prior Publication Data

US 2016/0196125 A1    Jul. 7, 2016

(30) Foreign Application Priority Data

Jan. 5, 2015  (JP) .................. 2015-000398

(51) Int. Cl.
*G06F 9/445*    (2006.01)
*H04L 29/08*    (2006.01)
*G06F 9/455*    (2006.01)

(52) U.S. Cl.
CPC ............ *G06F 8/61* (2013.01); *G06F 9/45504* (2013.01); *H04L 67/02* (2013.01); *H04L 67/34* (2013.01)

(58) Field of Classification Search
CPC ........................................ G06F 8/61
USPC .................. 717/168–178; 709/203
See application file for complete search history.

(56) References Cited

U.S. PATENT DOCUMENTS

| | | | | |
|---|---|---|---|---|
| 6,006,035 A * | 12/1999 | Nabahi | ...................... | G06F 8/61 709/221 |
| 6,493,871 B1 * | 12/2002 | McGuire | ................... | G06F 8/65 717/169 |
| 6,757,894 B2 * | 6/2004 | Eylon | ..................... | H04L 29/06 707/999.002 |

(Continued)

FOREIGN PATENT DOCUMENTS

| JP | 2007-519071 | 7/2007 |
|---|---|---|
| JP | 2011-501854 | 1/2011 |

(Continued)

OTHER PUBLICATIONS

Song et al, "Relationship Extraction Methods Based on Co-occurrence in Web Pages and Files ", ACM, pp. 82-89, 2011.*

(Continued)

*Primary Examiner* — Anil Khatri
(74) *Attorney, Agent, or Firm* — Fujitsu Patent Center

(57) ABSTRACT

An application providing method includes steps of, after registering a packaged application in which files included in an application are packaged, extracting the packaged application such that the packaged application is separated from other packaged applications for each host, converting, in accordance with an execution platform of the packaged application, the extracted content to content for a web browser, and, when an application acquisition request including a host name is received from the web browser, providing content that belongs to the host indicated by the host name included in the application acquisition request.

7 Claims, 16 Drawing Sheets

(56) References Cited

U.S. PATENT DOCUMENTS

| | | | |
|---|---|---|---|
| 6,904,449 B1* | 6/2005 | Quinones | G06Q 10/10 709/203 |
| 7,069,541 B2* | 6/2006 | Dougherty | G06F 8/20 717/121 |
| 7,395,534 B2* | 7/2008 | Alcazar | G06F 9/44521 717/174 |
| 7,536,686 B2* | 5/2009 | Tan | G06F 8/61 713/100 |
| 7,788,662 B2* | 8/2010 | Haselden | G06F 8/65 717/116 |
| 7,890,926 B2* | 2/2011 | Balathandapani | G06F 8/20 717/107 |
| 8,352,937 B2* | 1/2013 | Sanders | G06F 8/61 717/174 |
| 8,365,164 B1* | 1/2013 | Morgenstern | G06F 9/44552 717/108 |
| 8,527,979 B2* | 9/2013 | Wookey | G06F 8/68 717/169 |
| 8,533,704 B2* | 9/2013 | Wookey | G06F 8/68 717/174 |
| 8,566,391 B2* | 10/2013 | Saito | G06F 21/105 709/203 |
| 8,850,422 B2* | 9/2014 | Chang | H04L 67/34 717/173 |
| 8,869,140 B2* | 10/2014 | Todorova | G06F 8/61 717/126 |
| 9,027,016 B1* | 5/2015 | Alford | G06F 8/61 717/121 |
| 2004/0237083 A1 | 11/2004 | Alcazar et al. | |
| 2009/0157872 A1 | 6/2009 | Pinkston et al. | |
| 2011/0265164 A1 | 10/2011 | Lucovsky et al. | |
| 2014/0109078 A1 | 4/2014 | Lang et al. | |
| 2014/0109176 A1 | 4/2014 | Barton et al. | |
| 2014/0281883 A1 | 9/2014 | Burckart et al. | |

FOREIGN PATENT DOCUMENTS

| | | |
|---|---|---|
| JP | 2011-233146 | 11/2011 |
| WO | 2005045562 | 5/2005 |
| WO | 2009055492 | 4/2009 |

OTHER PUBLICATIONS

Giuffrida et al, "Knowledge-Based Metadata Extraction from PostScript Files", ACM, pp. 77-84, 2000.*

Gupta et al, "Extracting Content from Accessible Web Pages", ACM, pp. 26-30, 2005.*

Kowalkiewicz et al, "Robust Web Content Extraction", ACM, pp. 887-888, 2006.*

Gupta et al, "DOM-based Content Extraction of HTML Documents", ACM, pp. 207-214, 2003.*

Zigler et al, "Distilling Informative Content from HTML News Pages", IEEE, pp. 707-712, 2009.*

Spengler et al, "A Comparison of Discriminative Classifiers for Web News Content Extraction", ACM, pp. 172-175, 2010.*

Foote et al, " an IntelligentMediaBrowser using Automatic MultimodalAnalysis", ACM, pp. 375-380, 1998.*

EESR—The Extended European Search Report of European Patent Application No. 15200604.5 dated Jun. 8, 2016.

* cited by examiner

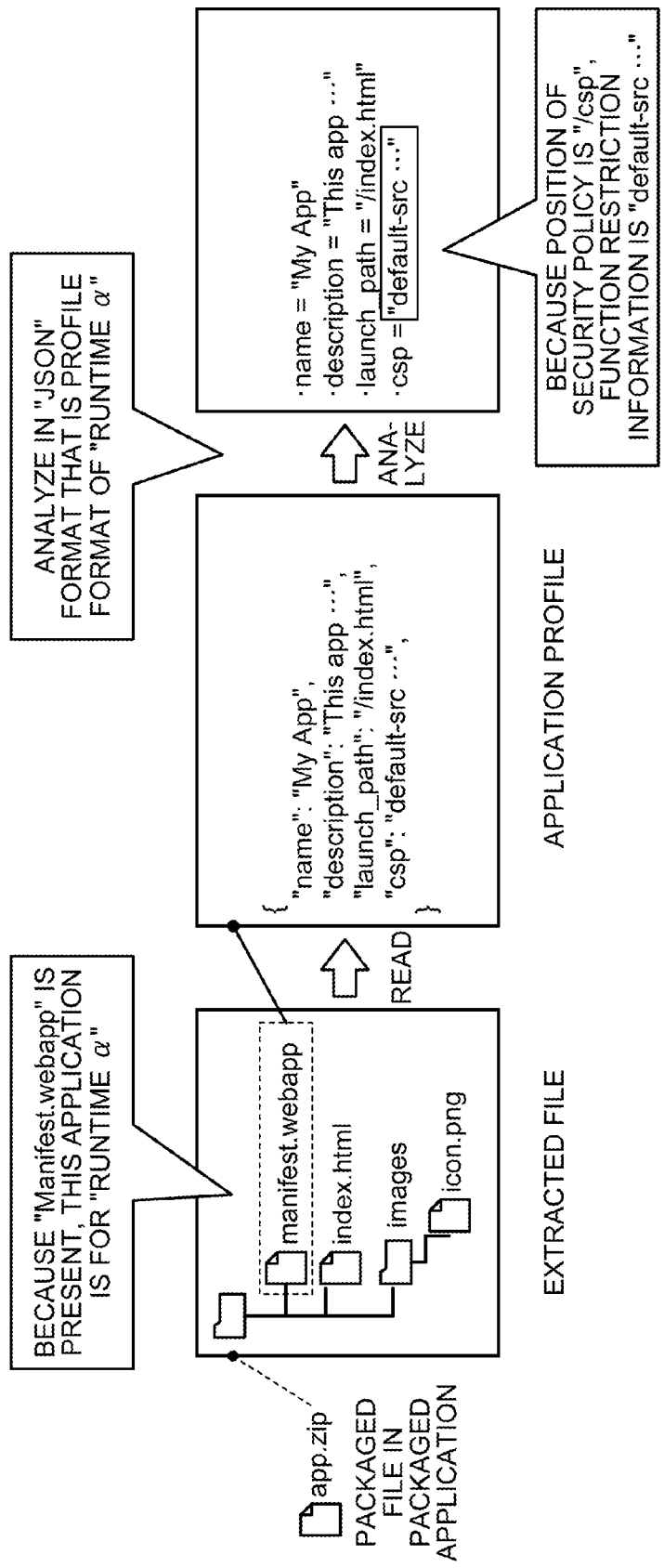

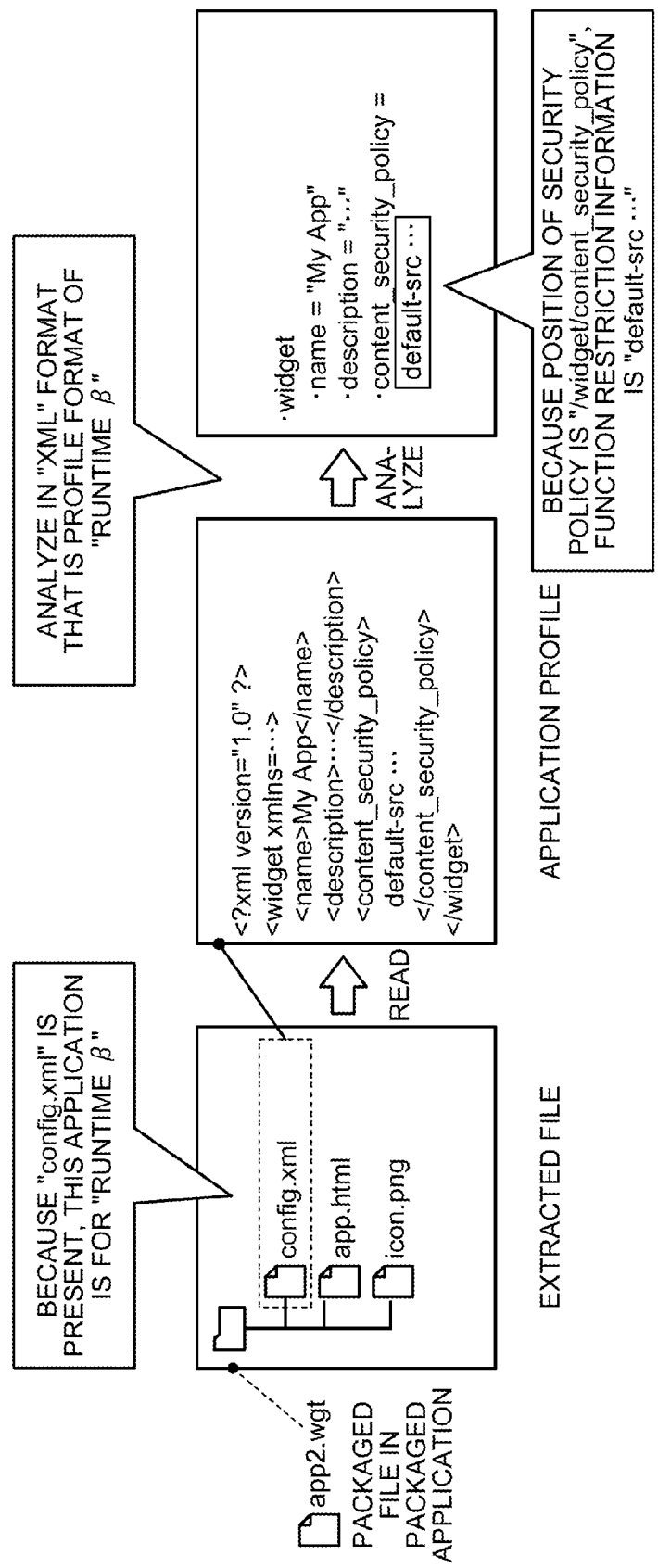

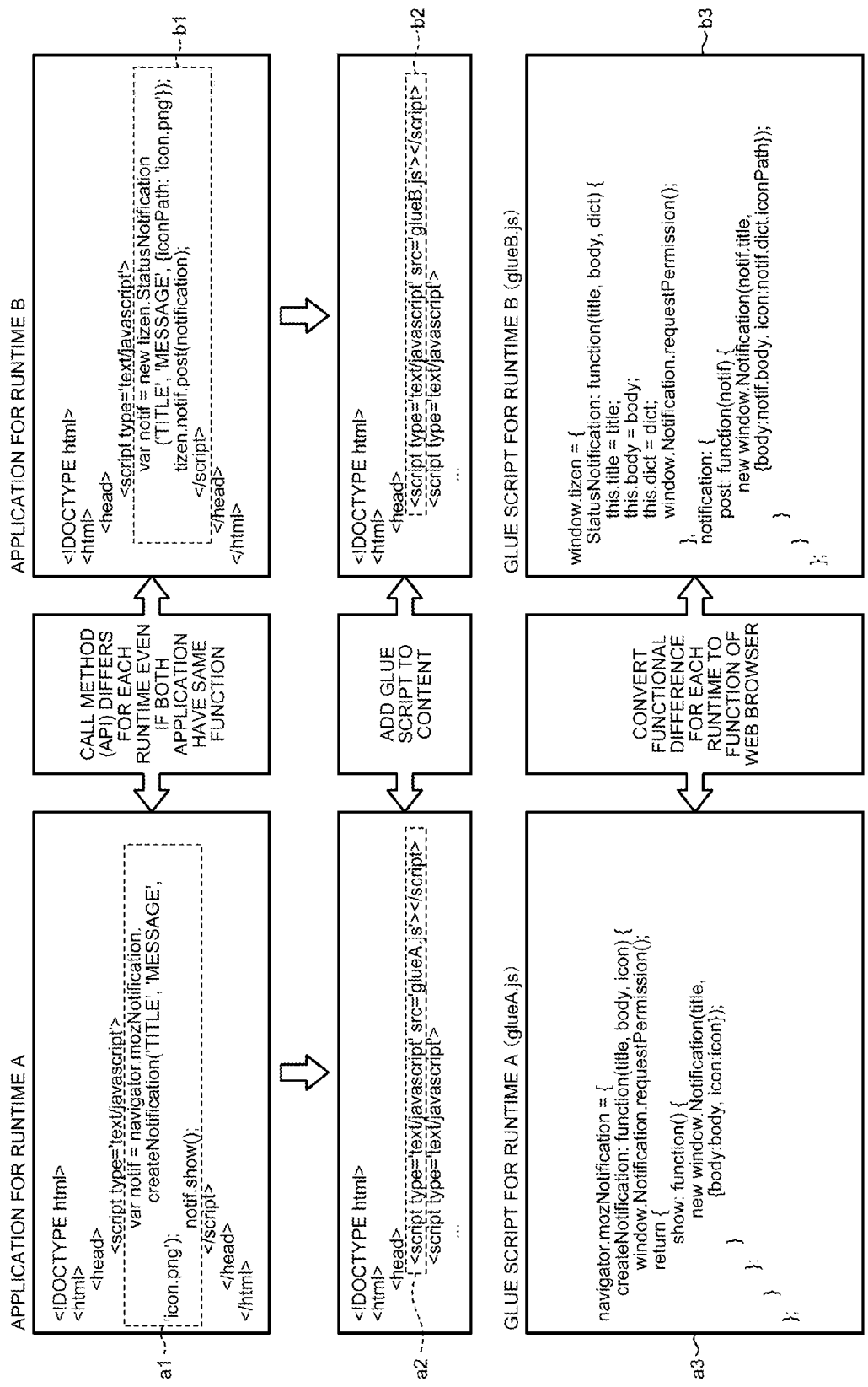

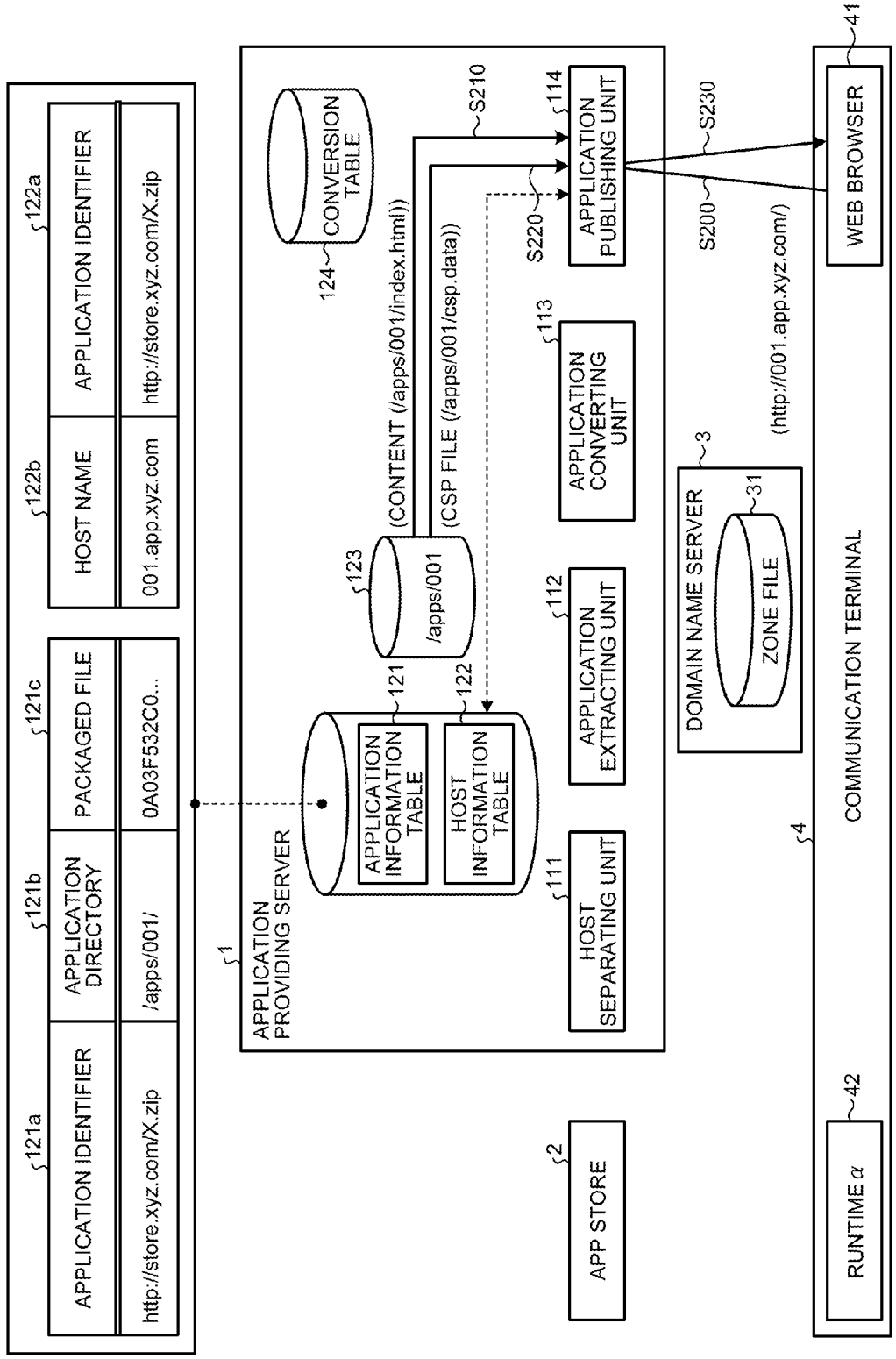

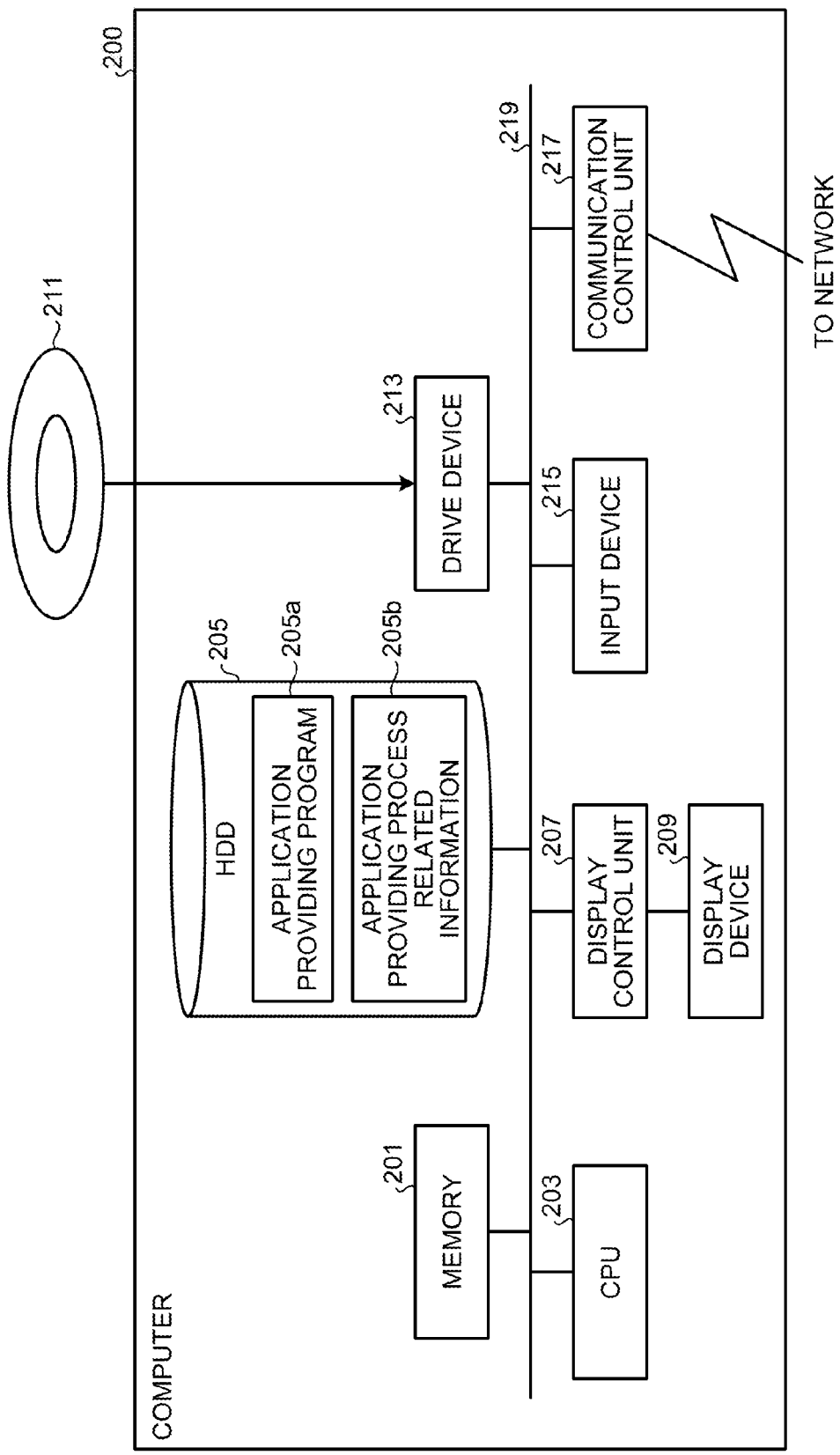

APPLICATION PROVIDING METHOD INCLUDING EXTRACTING AND CONVERTING PACKAGED APPLICATION

CROSS-REFERENCE TO RELATED APPLICATION

This application is based upon and claims the benefit of priority of the prior Japanese Patent Application No. 2015-000398, filed on Jan. 5, 2015, the entire contents of which are incorporated herein by reference.

FIELD

The embodiment discussed herein are related to an application providing method or the like.

BACKGROUND

In recent years, packaged applications in which all resources, such as applications, scripts, or the like, described in Hyper Text Markup Language (HTML) are collectively gathered in a single file have been introduced. With the advent of the packaged applications, on the terminal side, a web application structured by HTML5 technology can be acquired and executed offline. Namely, with the packaged applications, like native applications, an app store is prepared, a user on the terminal side selects a packaged application from the app store, and the selected packaged application is installed and used. The installed application is loaded by software (hereinafter, referred to as "runtime") that is a platform that executes the application.

If a packaged application is executed by runtime, because the runtime separates data that is used by each application for each packaged application, the packaged application can be securely executed.

Furthermore, in a web service, content is prepared in a web server, a user on the terminal side selects the content from the web server, and the selected content is loaded from the web server to the terminal and is used. The sent content is executed on a web browser on a terminal.

Patent Document 1: Japanese Laid-open Patent Publication No. 2011-233146

Patent Document 2: Japanese National Publication of International Patent Application No. 2011-501854

Patent Document 3: Japanese Patent No. 4796966

However, when the web browser executes the packaged application, there is a problem in that, in terms of security, the application is not securely executed.

This problem will be described. FIG. 15 is a schematic diagram illustrating a problem of not securely executing applications when a web browser executes packaged applications. As illustrated in FIG. 15, in an app store, a plurality of packaged applications are registered. It is assumed that the packaged applications registered in the app store are loaded and loaded pages (content) are registered in a web server.

In a terminal on the runtime side, the packaged applications selected by the user are installed and the installed applications are executed by the runtime. Because the runtime separates the installed applications for each application, the applications can be securely executed.

In contrast, a terminal on the web browser side, the pages selected by the user are loaded and the loaded pages are executed by a web browser. Because, on the web browser, for the loaded pages, the origin is not separated for each packaged application that is the load source of the page, the pages are not securely executed. Namely, on the web browser, because the origin is not separated for each packaged application, an access to data between the packaged applications is permitted. Namely, when the web browser executes the packaged applications, the packaged applications are not securely executed in terms of security.

SUMMARY

According to an aspect of the embodiments, an application providing method includes: extracting, after registering a packaged application in which files included in an application are packaged, the packaged application such that the packaged application is separated from other packaged applications for each host, by a processor of a web server; converting, in accordance with an execution platform of the packaged application, content extracted at the extracting to content for a web browser, by the processor; and providing, when an application acquisition request including a host name is received from the web browser, content that belongs to the host indicated by the host name included in the application acquisition request, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A is a schematic diagram illustrating an example of a process of identifying a runtime type and function restriction information;

FIG. 6B is a schematic diagram illustrating another example of a process of identifying a runtime type and function restriction information;

FIG. 7 is a schematic diagram illustrating an example of an application conversion process according to the embodiment;

FIG. 13B is a schematic diagram illustrating a specific example of the application providing process according to the embodiment;

FIG. 14 is a block diagram illustrating an example of a computer that executes an application providing program.

DESCRIPTION OF EMBODIMENTS

Preferred embodiments will be explained with reference to accompanying drawings. The present invention is not limited to the embodiment.

Example of an Application Providing Process

Figure 1:
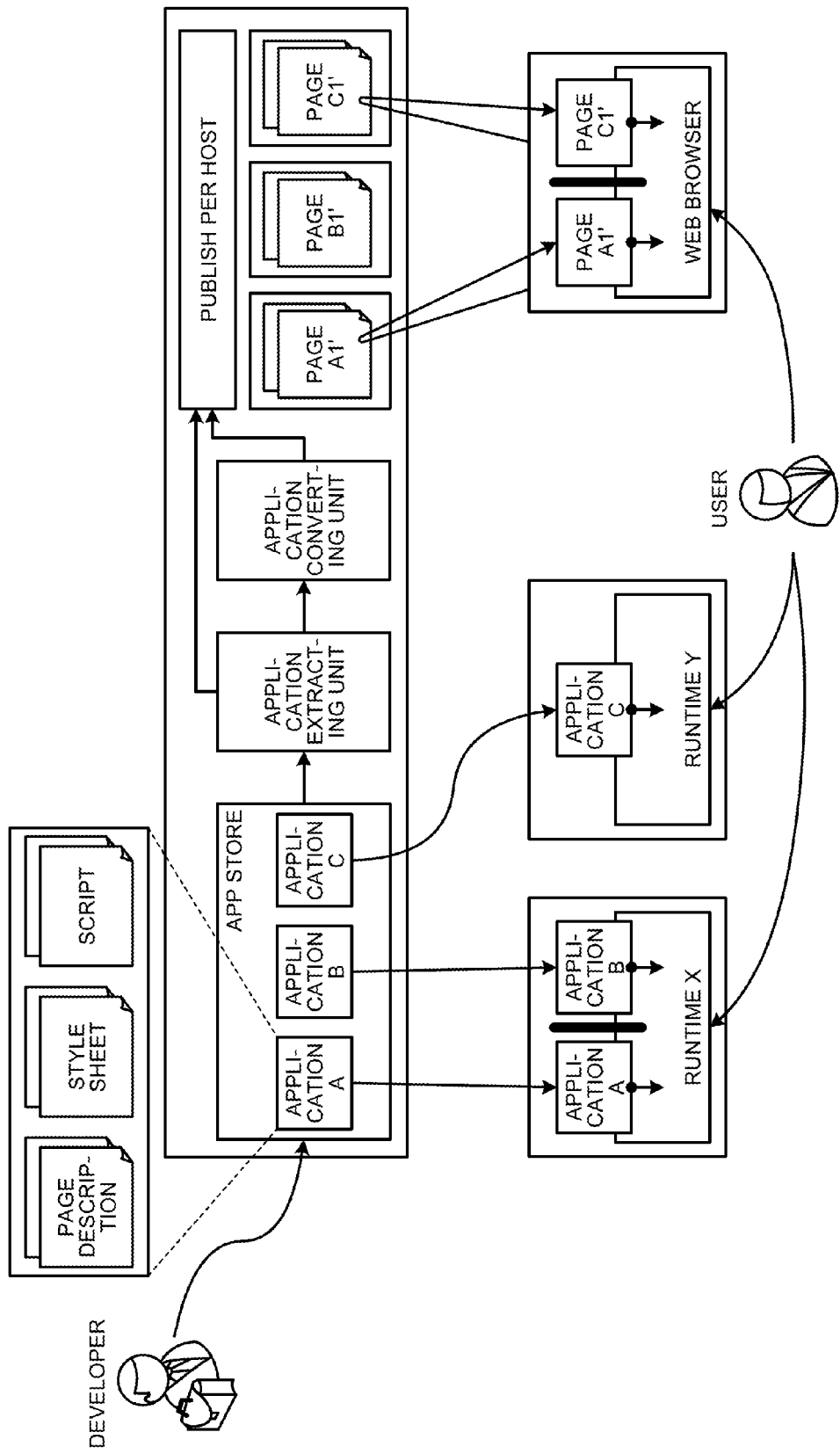
FIG. 1 is a schematic diagram illustrating an example of an application providing process according to an embodiment.

FIG. 1 is a schematic diagram illustrating an example of an application providing process according to an embodiment. As illustrated in FIG. 1, the application providing process outputs a packaged application registered in an app store to an application extracting unit. The application providing process extracts, by using the application extracting unit, the output packaged application such that the output packaged application is separated from other packaged applications for each host. The application providing process converts, by using an application converting unit, the extracted content to the content for a web browser in accordance with an execution platform of the subject packaged application. Consequently, the extracted content belongs to the host distinguished from the other packaged applications and is published to the web browser. Then, when the application providing process receives an application acquisition request including a host name from the web browser, the application providing process provides the extracted content that belongs to the host included in the application acquisition request.

The app store mentioned here is a providing channel that is used to provide a packaged application. The packaged application mentioned here is a file in which the resources, such as pages, scripts, or the like, described in HTML needed to execute a specific application are assembled as a single set. The packaged application includes therein, for example, an application profile in which information on the application is described, a page described in HTML, a style sheet, a script, or the like. The packaged application is subjected to programming by using an API that is associated with specific runtime. The runtime mentioned here indicates platform software that executes an installed application. The function provided by runtime differs for each piece of runtime. Accordingly, the packaged application can execute the function provided by the runtime that is the execution environment of the packaged application. The function provided by the runtime includes, for example, a function of a device, a function of security protection, or the like.

Consequently, in a terminal on the web browser side, for the provided content, because the origin is separated from the content of the other packaged application, the provided content can be securely executed. Namely, in the web browser, because the origin is separated for each packaged application, it is possible to restrict an access to data among the packaged applications.

Furthermore, in a terminal on the runtime side, from among packaged applications registered in the app store, packaged applications selected by a user are installed and the installed applications are executed by runtime. Because the runtime separates, for each application, the installed applications, it is possible to securely execute the applications.

Configuration of the Application Providing System

Figure 2:
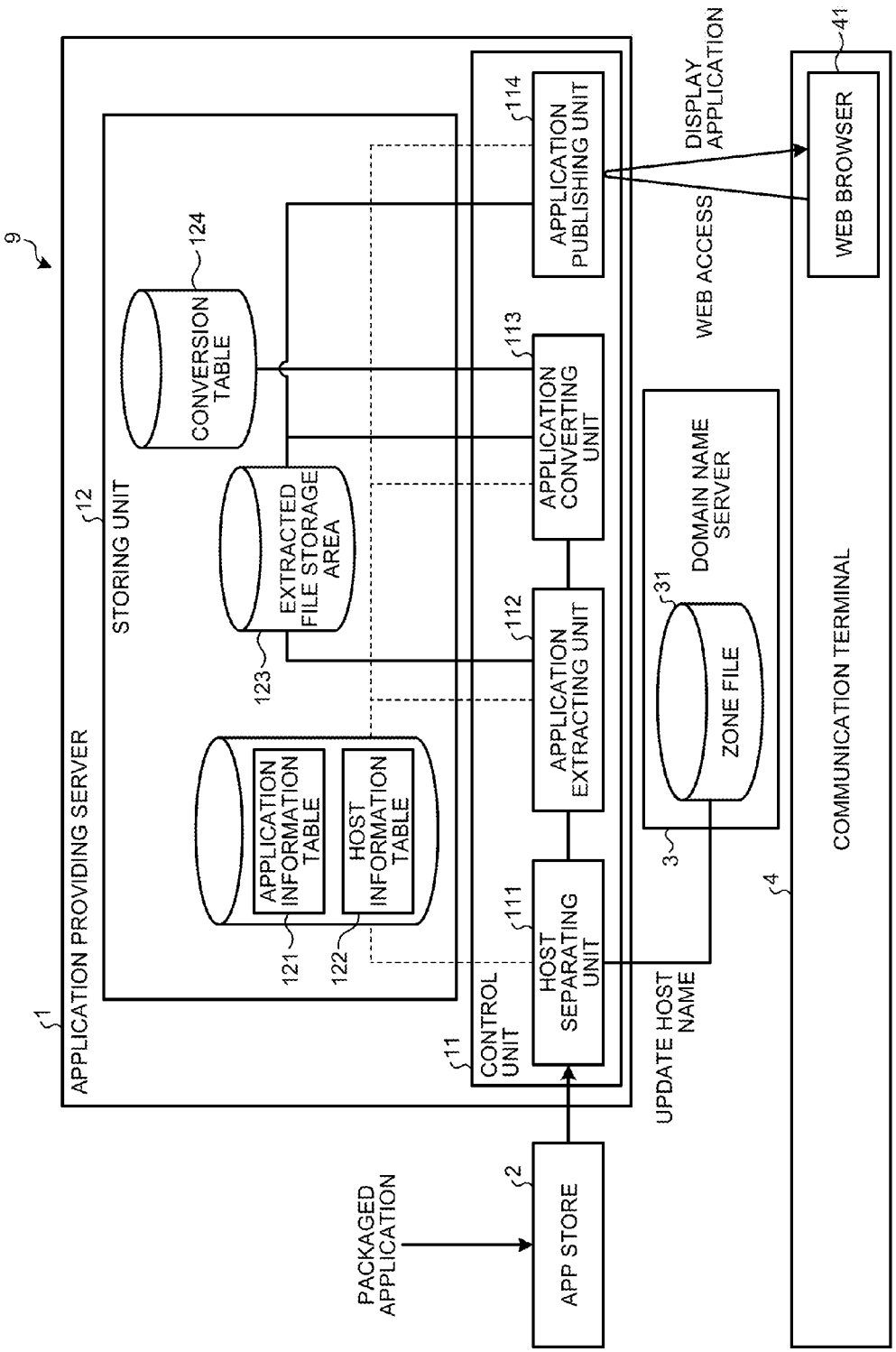
FIG. 2 is a functional block illustrating the configuration of an application providing system according to the embodiment.

FIG. 2 is a functional block illustrating the configuration of an application providing system according to the embodiment. As illustrated in FIG. 2, an application providing system 9 includes an application providing server 1, an app store 2, a domain name server 3, and a communication terminal 4.

The app store 2 registers a packaged application. Furthermore, the app store 2 provides a packaged application in accordance with a request from the terminal on the runtime side.

The application providing server 1 executes the application providing process. The application providing server 1 includes a control unit 11 and a storing unit 12.

The control unit 11 includes an internal memory that stores therein control data and programs in which various kinds of procedures are prescribed, whereby various kinds of processes are executed. The control unit 11 corresponds to, for example, an electronic circuit in an integrated circuit, such as an application specific integrated circuit (ASIC), a field programmable gate array (FPGA), and the like. Alternatively, the control unit 11 includes a host separating unit 111, an application extracting unit 112, an application converting unit 113, and an application publishing unit 114.

The storing unit 12 corresponds to, for example, a non-volatile semiconductor memory device, such as a flash memory or the like, or a storage device, such as a hard disk drive (HDD), or the like. In the storing unit 12, an application information table 121, a host information table 122, a extracted file storage area 123, and a conversion table 124 are included. The application information table 121 stores therein application information on packaged applications. In the application information, for a packaged application, the application identifier, the directory of the extract destination, and the content of a packaged file are included. The application information is present for each packaged application. The host information table 122 stores therein host information on packaged applications. The host information includes therein, in an associated manner, the application identifier, the host name, and the host identifier. The host information is present for each application identifier. The extracted file storage area 123 is an area that stores therein the content obtained from the result of extracting a packaged application. The packaged application is extracted in the directory at the extract destination of the host that is associated with the application identifier. The conversion table 124 stores therein conversion information that is used to convert a packaged application to content for a web browser. Furthermore, an example of the data structure of each of the application information table 121, the host information table 122, and the conversion table 124 will be described later.

The host separating unit 111 separates hosts for each application identifier of a packaged application. Namely, the host separating unit 111 separates, for each application identifier of a packaged application, the origins in the application providing server 1. For example, when the host separating unit 111 receives an application identifier of a packaged application and a packaged file from the app store 2, the host separating unit 111 acquires the application information that is associated with the received application identifier from the application information table 121. If the application information associated with the received application identifier is not present, the host separating unit 111 stores, in the application information table 121, the application information associated with the received application identifier. Furthermore, the host separating unit 111 acquires the host information that is associated with the received application identifier from the host information table 122. If the host information associated with the received application identifier is not present, the host separating unit 111 decides the host name associated with the received application identifier and stores, in the host information table 122, the host information that includes therein the decided host name. The host separating unit 111 decides a unique host name for each application identifier. Furthermore, if the host separating unit 111 decides the host name, the host separating unit 111 notifies the domain name server 3 of the decided host name.

It has been described that the host separating unit 111 separates hosts for each application identifier of a packaged application. There may be a case in which an application identifier and a packaged file of a packaged application has a one-to-one relationship, or a one-to-many relationship. When the application identifier and the packaged file has a one-to-one relationship, a unique host name is decided with respect to the single packaged application. Consequently, the host separating unit 111 can restrict access to data on the other packaged application. In contrast, when the application identifier and the packaged file has a one-to-many relationship, a unique host name is decided to the plurality of packaged applications that have the same application identifier. Consequently, the host separating unit 111 can separate, for example, for each tenant, the hosts of the packaged applications and thus it is possible to restrict access to the data on the packaged applications distributed to other tenants.

Figure 3:
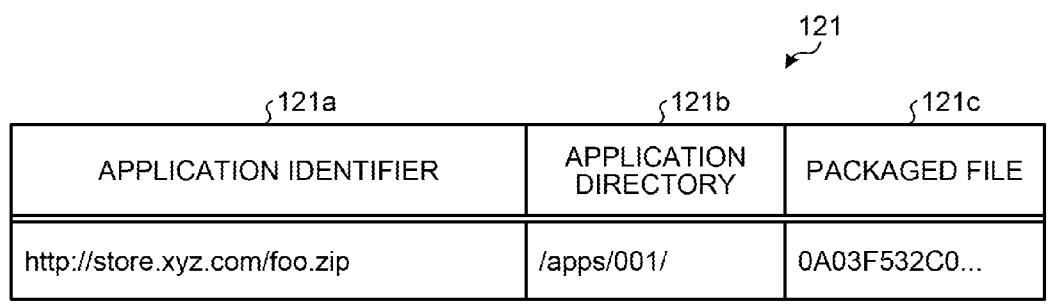
FIG. 3 is a schematic diagram illustrating an example of the data structure of an application information table according to the embodiment.

In the following, the data structure of the application information table 121 will be described with reference to FIG. 3. FIG. 3 is a schematic diagram illustrating an example of the data structure of an application information table according to the embodiment. As illustrated in FIG. 3, the application information table 121 stores therein, in an associated manner, an application identifier 121*a*, an application directory 121*b*, and a packaged file 121*c*. If the application identifier 121*a* and the packaged application has a one-to-one relationship, the application identifier 121*a* is an identifier that uniquely identifies a packaged application. If the application identifier 121*a* and the packaged application has a one-to-many relationship, the application identifier 121*a* is the identifier that uniquely identifies a plurality of packaged applications associated with a host. The application directory 121*b* is the directory at the destination in which a packaged application is extracted. The packaged file 121*c* indicates the content of a packaged application.

As an example, if the application identifier 121*a* is "http://store.xyz.com/foo.zip", the application information table 121 stores therein "/apps/001/" as the application directory 121*b* and "0A03F532C0 . . . " as the packaged file 121*c*.

Figure 4:
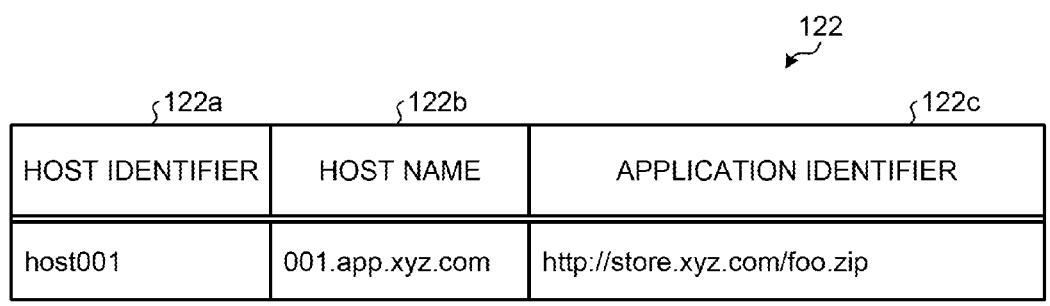
FIG. 4 is a schematic diagram illustrating an example of the data structure of a host information table according to the embodiment.

The data structure of the host information table 122 will be described with reference to FIG. 4. FIG. 4 is a schematic diagram illustrating an example of the data structure of a host information table according to the embodiment. As illustrated in FIG. 4, the host information table 122 stores therein, in an associated manner, a host identifier 122*a*, a host name 122*b*, and an application identifier 122*c*. The host identifier 122*a* is a host identifier. The host name 122*b* is a host name. The application identifier 122*c* is associated with the application identifier 121*a* in the application information table 121. Namely, if the application identifier 122*c* and the packaged application has a one-to-one relationship, the application identifier 122*c* is an identifier that uniquely identifies a packaged application. If the application identifier 122*c* and the packaged application has a one-to-many relationship, the application identifier 122*c* is an identifier that uniquely identifies the plurality of packaged applications associated with a host.

As an example, if the host identifier 122*a* is "host001", the host information table 122 stores therein "001.app.xyz.com" as the host name 122*b* and "http://store.xyz.com/foo.zip" as the application identifier 122*c*.

A description will be given here by referring back to FIG. 2. The application extracting unit 112 extracts the packaged application such that the packaged application is separated, for each host, from other packaged applications each having a different application identifier. For example, the application extracting unit 112 acquires the application information associated with the application identifier from the application information table 121. The application extracting unit 112 extracts the packaged file 121*c* under the application directory 121*b* that are included in the acquired application information. If a file is present under the application directory 121*b*, the application extracting unit 112 deletes the file and then extracts the packaged file 121*c*. Furthermore, if the file is present under the application directory 121*b*, the application extracting unit 112 may also compare, before extracting the file, the packaged file 121*c* with the file under the application directory 121*b* and extract the packaged file 121*c* if it has been modified.

The application converting unit 113 converts the extracted file (content) to the content for a web browser 41 in accordance with the execution platform (runtime) of the packaged application. Namely, in order to execute the packaged application on the web browser 41, the application converting unit 113 converts the application profile and the script included in the extracted file. For example, based on the file name of the application profile included in the extracted file and the conversion table 124, the application converting unit 113 identifies the type of the runtime. The application profile mentioned here is the profile in which information on the packaged application is described. The reason for identifying the type of the runtime is that the packaged application is created by using an API that is associated with the specific runtime and the function provided by the runtime differs for each piece of runtime. Furthermore, instead of the file name of the application profile, the type of the runtime may also be identified by an extension name (.zip or .wgt) or the like of the application packaged file.

Figure 5:
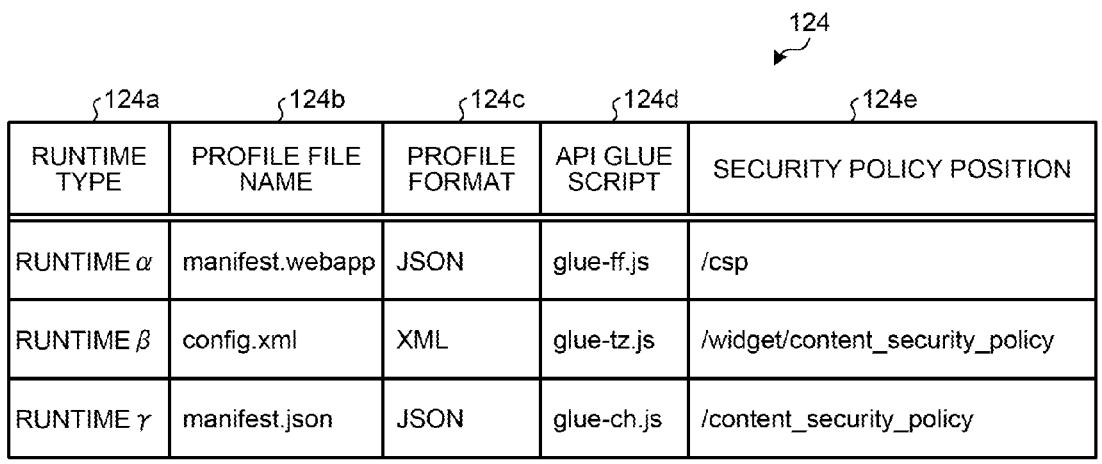
FIG. 5 is a schematic diagram illustrating an example of the data structure of a conversion table according to the embodiment.

In the following, the data structure of the conversion table 124 will be described with reference to FIG. 5. FIG. 5 is a schematic diagram illustrating an example of the data structure of a conversion table according to the embodiment. As illustrated in FIG. 5, the conversion table 124 stores therein, in an associated manner, a runtime type 124*a*, a profile file name 124*b*, a profile format 124*c*, an API glue script 124*d*, and a security policy position 124*e*. The runtime type 124*a* indicates the type of runtime. The profile file name 124*b* indicates the file name of an application profile. The profile format 124*c* indicates the format of the application profile. The API glue script 124*d* is a script that is used to flatten a functional difference between the runtime and the web browser 41. The API glue script 124*d* differs for each runtime type. The security policy position 124*e* indicates the position of the security policy described in the application profile. For example, the application converting unit 113 compares the file name of the application profile included in the extracted file as a key with the profile file name 124*b* in the conversion table 124. If the file name is present, the application converting unit 113 identifies the associated runtime type 124*a* as the type of the runtime.

As an example, if the runtime type 124*a* is "runtime α", the conversion table 124 stores therein "mainfest.webapp" as the profile file name 124*b*, "JSON" as the profile format 124*c*, "glue-ff.js" as the API glue script 124*d*, and "/csp" as the security policy position 124*e*.

A description will be given here by referring back to FIG. 2. The application converting unit 113 reads, based on the identified type of the runtime and the conversion table 124, the API glue script 124*d* that is associated with the identified type of the runtime. The application converting unit 113 embeds the read API glue script 124*d* in the extracted file. Consequently, the application converting unit 113 can convert the packaged application so as to flatten a functional difference between the web browser 41 and the runtime that is the execution platform of the packaged application.

Furthermore, the application converting unit 113 identifies the security policy that is the function restriction information described in the application profile and then converts the identified security policy to content security policy (CSP) that can be recognized by the web browser 41. The CSP mentioned here is a security protection method of the web content standardized in the World Wide Web Consortium (W3C). After converting the packaged application, the application converting unit 113 sets a report uniform resource identifier (URI) that is the notification destination at the time of CSP violation in the host decided in the host separating unit 111. The application converting unit 113 stores the converted CSP under the application directory 121*b*.

The application publishing unit 114 provides the content of the application that is associated with the request from the web browser 41. For example, the application publishing unit 114 acquires an application URL from a request unit in HTTP and extracts the host name and the file path from the acquired application URL. The application URL mentioned here indicates the URL for accessing the application. The application publishing unit 114 acquires the host information and the application information from the application information table 121 and the host information table 122 by using the extracted host name and the extracted file path as a key. The application publishing unit 114 sets, in a response, the file of the acquired application information under the application directory 121*b*.

As an example, if the host name and the application (packaged file) have one-to-one relationship, the application URL is represented by "http://<host name>/". If the application URL is "http://001.app.xyz.com", the application publishing unit 114 extracts the host name "001.app.xyz.com" from the application URL. Then, the application publishing unit 114 acquires, based on the host information table 122, an application identifier that is associated with the extracted host name. The application publishing unit 114 acquires, based on the application information table 121, the application directory 121*b* that is associated with the acquired application identifier. The application publishing unit 114 sets, in a response, the file of the host indicated by the host name under the application directory 121*b*.

As another example, if the host name and the application (packaged file) have one-to-many relationship, the application URL is represented by "http://<host name>/<file path>/". If the application URL is "http://001.app.xyz.com/apps/002/", the application publishing unit 114 extracts, from the application URL, the host name "001.app.xyz.com" and the file path "/apps/002/". Then, the application publishing unit 114 acquires, based on the host information table 122, the application identifier that is associated with the extracted host name. The application publishing unit 114 acquires, based on the application information table 121, the application directory that matches the file path from the application directory 121*b* that is associated with the acquired application identifier. The application publishing unit 114 sets, in a response, the file of the host indicated by the host name under the application directory.

Furthermore, if a CSP is present under the acquired application directory 121*b* in the application information, the application publishing unit 114 adds the CSP to the response header. The application publishing unit 114 sends a response to the web browser 41 as a reply.

The domain name server 3 sets, in a zone file 31, a combination of the newly decided host name and the IP address of the application providing server 1. This is performed such that the web browser 41 can access the application providing server 1 by the newly decided host name. Furthermore, it is assumed that the IP address of the application providing server 1 is previously set. The IP address used here may also be a single IP address or may also be a plurality of IP addresses.

The communication terminal 4 includes the web browser 41. The communication terminal 4 is, for example, a smartphone, a personal handy phone system (PHS), a personal digital assistant (PDA), or a personal computer (PC) as long as a communication terminal that can perform communication and that includes the web browser 41.

The communication terminal 4 sends a request from the web browser 41 to the application providing server 1 and receives the content that is associated with the sent request. An application URL is included in the request.

Example of a Process of Identifying the Runtime Type and Function Restriction Information FIG. 6A is a schematic diagram illustrating an example of a process of identifying a runtime type and function restriction information. As illustrated in FIG. 6A, in the extracted file, the file obtained as the result of extracting the packaged file "app.zip" in the packaged application is indicated.

First, the application converting unit 113 identifies the type of runtime based on the file name of the application profile that is included in the extracted file and based on the conversion table 124. Here, in the extracted file, the application profile with the file name of "manifest.webapp" is included. The file name of "manifest.webapp" matches the profile file name 124*b* in the conversion table 124 (see FIG. 5). Thus, the application converting unit 113 identifies, as the type of the runtime, the runtime type 124*a* "runtime α" that is associated with the profile file name 124*b* "manifest.webapp".

Consequently, the application converting unit 113 uses the API glue script 124*d* that is associated with the identified type of the runtime and converts the packaged application so as to flatten the functional difference between the runtime, which is the execution platform of the packaged application, and the web browser 41.

Furthermore, the application converting unit 113 analyzes the application profile by using the profile format associated with the runtime type. Here, the application converting unit 113 refers to the conversion table 124 (see FIG. 5) and acquires the profile format 124*c* "JSON" and the security policy position 124*e* "/csp" that are associated with the runtime type 124*a* "runtime α". The application converting unit 113 reads the application profile with the file name of "manifest.webapp" and analyzes the read application profile by using the "JSON" format that is the profile format. Then, based on the result of the analysis, the application converting unit 113 identifies, as the function restriction information, "default-src . . . " positioned at the security policy position 124e "/csp".

Consequently, the application converting unit 113 can store the identified function restriction information as the CSP under the application directory 121b.

Another Example of a Process of Identifying the Runtime Type and Function Restriction Information FIG. 6B is a schematic diagram illustrating another example of a process of identifying a runtime type and function restriction information. As illustrated in FIG. 6B, in the extracted file, the file obtained as the result of extracting the packaged file "app2.wgt" in the packaged application is indicated.

First, the application converting unit 113 identifies the type of runtime based on the file name of the application profile that is included in the extracted file and based on the conversion table 124. Here, in the extracted file, the application profile with the file name of "config.xml" is included. The file name of "config.xml" matches the profile file name 124b in the conversion table 124 (see FIG. 5). Thus, the application converting unit 113 identifies, as the type of the runtime, the runtime type 124a "runtime β" that is associated with the profile file name 124b "config.xml".

Consequently, the application converting unit 113 uses the API glue script 124d that is associated with the identified type of the runtime and converts the packaged application so as to flatten the difference between the runtime, which is the execution platform of the packaged application, and the web browser 41.

Furthermore, the application converting unit 113 analyzes the application profile by using the profile format associated with the runtime type. Here, the application converting unit 113 refers to the conversion table 124 (see FIG. 5) and acquires the profile format 124c "XML" and the security policy position 124e "/widget/content_security_policy" that are associated with the runtime type 124a "runtime β". The application converting unit 113 reads the application profile with the file name of "config.xml" and analyzes the read application profile by using the "XML" format that is the profile format. Then, based on the result of the analysis, the application converting unit 113 identifies, as the function restriction information, "default-src . . . " positioned at the security policy position 124e "/widget/content_ security_policy".

Consequently, the application converting unit 113 can store the identified function restriction information as the CSP under the application directory 121b.

Example of the Application Conversion Process

FIG. 7 is a schematic diagram illustrating an example of an application conversion process according to the embodiment. In FIG. 7, it is assumed that the API glue script of the application for runtime A is "glueA.js" and the API glue script of the application for runtime B is "glueB.js". As illustrated in FIG. 7, it is assumed that the application for the runtime A and the application for the runtime B having the same function are present. Between the application for the runtime A and the application for the runtime B, a call (API) method differs for each runtime. Here, in the application for the runtime A, the API indicated by a symbol a1 is present, whereas, in the application for the runtime B, the API indicated by a symbol b1 is present.

Under such conditions, the application converting unit 113 adds the API glue script 124d to the extracted file.

Here, the application converting unit 113 adds the API glue script "glueA.js" to the application for the runtime A. The symbol a2 is the result obtained by adding the API glue script "glueA.js" to the application for the runtime A. The entity of the API glue script "glueA.js" that is added to the application for the runtime A is represented by a symbol a3.

Furthermore, the application converting unit 113 adds the API glue script "glueB.js" to the application for the runtime B. The symbol b2 is the result obtained by adding the API glue script "glueB.js" to the application for the runtime B. The entity of the API glue script "glueB.js" that is added to the application for the runtime B is represented by the symbol b3.

As described above, the application converting unit 113 converts the functional difference for each runtime to the function of the web browser 41.

Example of a Glue Script

Figure 8:
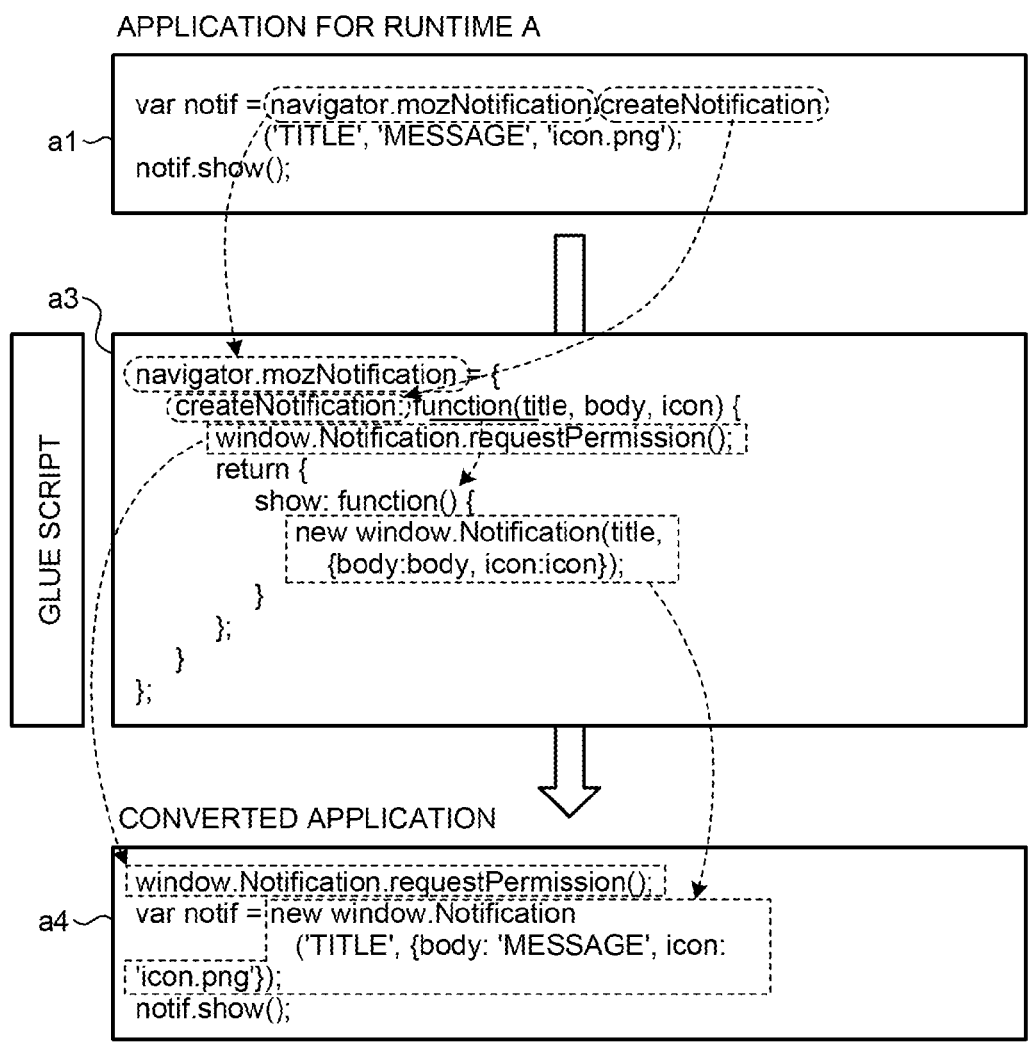
FIG. 8 is a schematic diagram illustrating an example of a glue script.

FIG. 8 is a schematic diagram illustrating an example of a glue script. A first column illustrated in FIG. 8 is obtained by extracting a portion of the API indicated by the symbol a1 from the application for the runtime A illustrated in FIG. 7. The glue script indicated in a second column illustrated in FIG. 8 is the entity (the symbol a3) of the glue script "glueA.js" for the runtime A illustrated in FIG. 7. As illustrated in FIG. 8, by adding the glue script for the runtime A to the application for the runtime A, the application converting unit 113 converts the application for the runtime A to the converted application indicated by a symbol a4.

As an example, the application converting unit 113 converts, based on the glue script, the name of the API, the format of an argument, and the order to the format that is used in the conversion destination. Here, for example, the name of the API "navigator.mozNotification.createNotification" is converted to "new window.Notification" that is indicated by the "function".

As another example, based on the glue script, the application converting unit 113 adds, to the converted application, the pre-processing and the post-processing performed when an API is used. Here, for example, "window.Notification.requestPermission( )" is added before the API as the preprocessing.

Flowchart of the Host Separation Process

Figure 9:
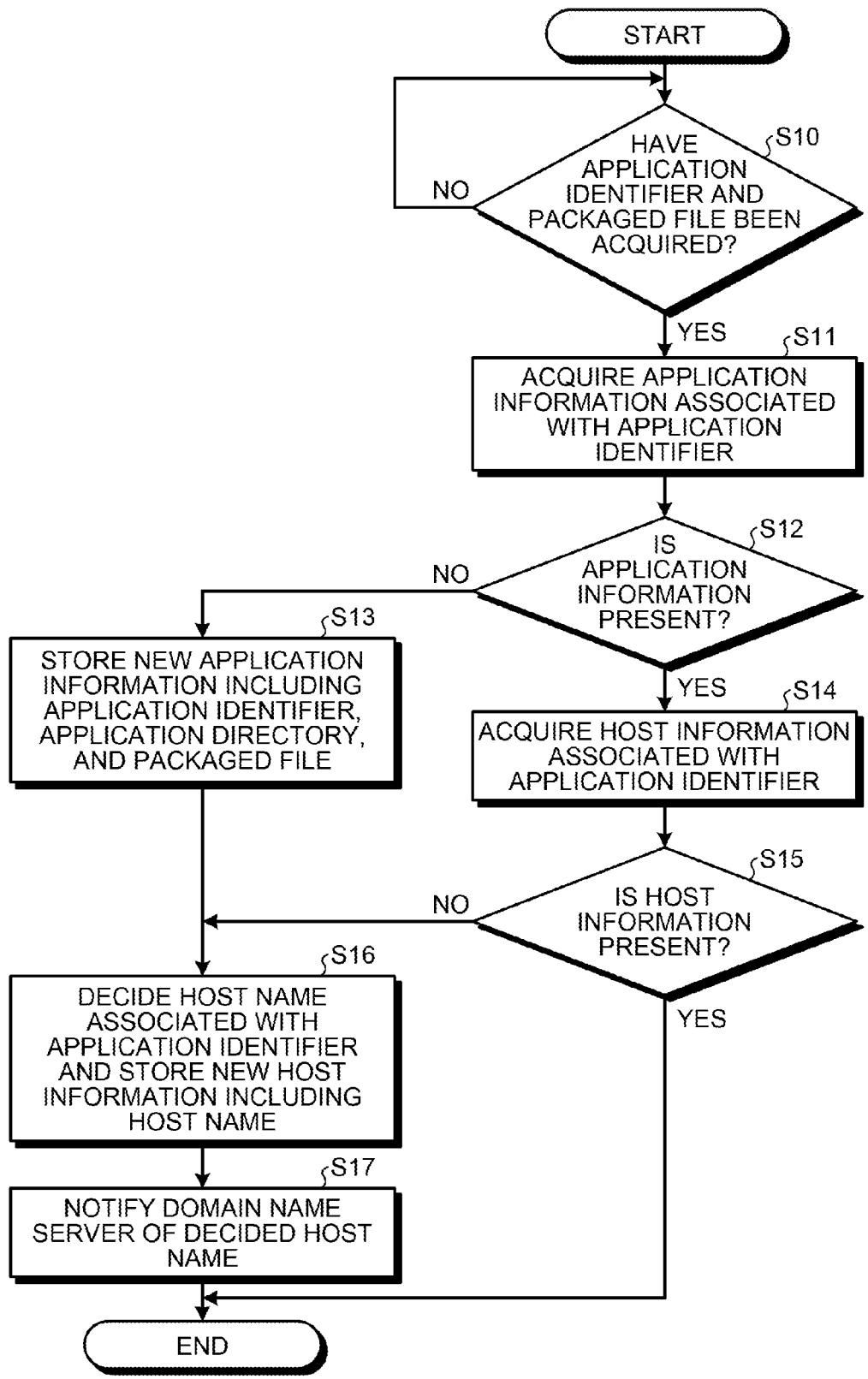
FIG. 9 is a flowchart illustrating the flow of a host separation process according to the embodiment.

FIG. 9 is a flowchart illustrating the flow of a host separation process according to the embodiment.

As illustrated in FIG. 9, the host separating unit 111 determines whether the host separating unit 111 has acquired the application identifier of a packaged application registered in the app store 2 and a packaged file from the app store 2 (Step S10). If the host separating unit 111 determines that the host separating unit 111 has not acquired the application identifier and the packaged file (No at Step S10), the host separating unit 111 repeats the determination process until that the host separating unit 111 acquires the application identifier and the packaged file.

In contrast, if the host separating unit 111 determines that the host separating unit 111 has acquired the application identifier and the packaged file (Yes at Step S10), the host separating unit 111 acquires, from the application information table 121, the application information associated with the application identifier (Step S11). The host separating unit 111 determines whether the application information associated with the application identifier is present in the application information table 121 (Step S12).

If the host separating unit 111 determines that the application information is not present (No at Step S12), the host separating unit 111 stores, in the application information table 121, new application information that includes therein an application identifier, an application directory, and a packaged file (Step S13). Then, the host separating unit 111 proceeds to Step S16 in order to separate the host.

In contrast, if the host separating unit 111 determines that the application information is present (Yes at Step S12), the host separating unit 111 acquires, from the host information table 122, the host information that is associated with the application identifier (Step S14). The host separating unit 111 determines whether the host information associated with the application identifier is present in the host information table 122 (Step S15).

If the host separating unit 111 determines that the host information is present (Yes at Step S15), the host separating unit 111 ends the host separation process.

In contrast, if the host separating unit 111 determines that the host information is not present (No at Step S15), the host separating unit 111 decides the host name associated with the application identifier. The host separating unit 111 stores, in the host information table 122, new host information that includes therein the decided host name (Step S16). For example, the host separating unit 111 decides a unique host name for each application identifier. Then, the host separating unit 111 stores, in the host information table 122, host information in which the decided host name, the host identifier, and the application identifier are associated.

The host separating unit 111 notifies the domain name server 3 of the decided host name (Step S17). In the domain name server 3, a pair of the notified host name and the IP address of the application providing server 1 is set in the zone file 31. Then, the host separating unit 111 ends the host separation process.

Consequently, the host separating unit 111 can separate a packaged file linked with the specific application identifier by a host that is different from that of the packaged file linked with another application identifier.

Flowchart of the Application Extracting Process

Figure 10:
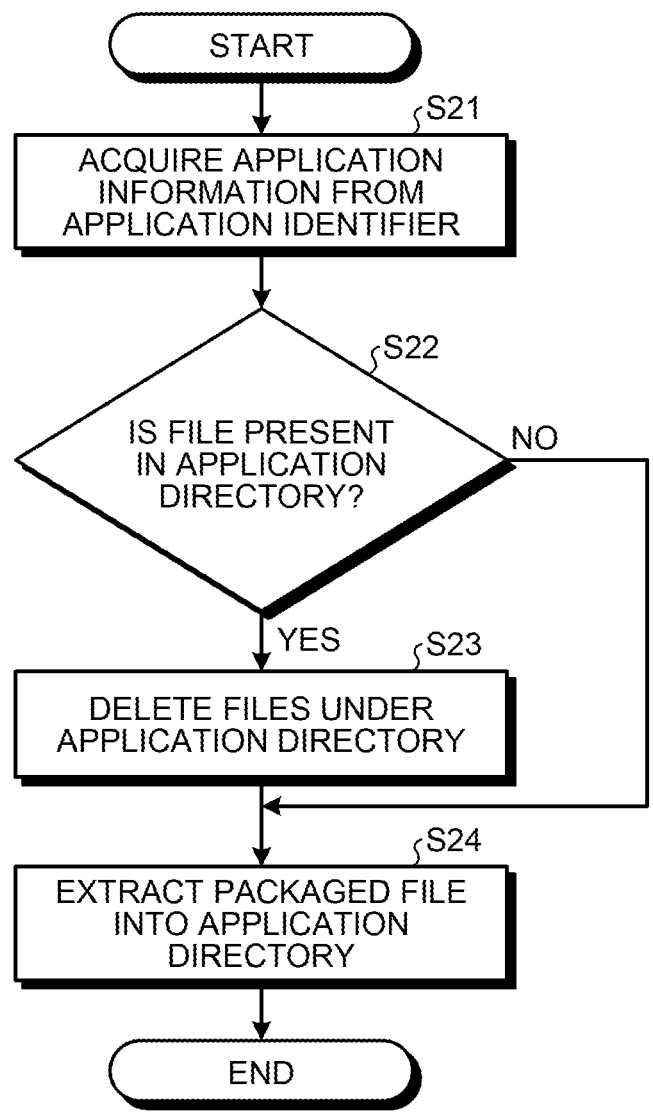
FIG. 10 is a flowchart illustrating the flow of an application extracting process according to the embodiment.

FIG. 10 is a flowchart illustrating the flow of an application extracting process according to the embodiment. Furthermore, it is assumed that the application extracting unit 112 has received an application identifier and a packaged file from the host separating unit 111.

As illustrated in FIG. 10, the application extracting unit 112 acquires, based on the application information table 121, the application information from the received application identifier (Step S21). In the application information, the application directory 121b and the packaged file 121c that are associated with the application identifier 121a are included.

The application extracting unit 112 determines whether a file is present in the application directory included in the application information (Step S22). For example, the application extracting unit 112 acquires, based on the host information table 122, the host information from the received application identifier. Then, the application extracting unit 112 determines whether the file is present in the area that is specified by the host name 122b included in the host information and that is specified by the application directory 121b included in the application information.

If the application extracting unit 112 determines that a file is present in the application directory (Yes at Step S22), the application extracting unit 112 deletes the files under the application directory (Step S23). Then, the application extracting unit 112 proceeds to Step S24.

In contrast, if the application extracting unit 112 determines that no file is present in the application directory (No at Step S22), the application extracting unit 112 proceeds to Step S24.

At Step S24, the application extracting unit 112 extracts the packaged file received from the application extracting unit 112 into the application directory (Step S24). Then, the application extracting unit 112 ends the application extracting process.

Flowchart of the Application Conversion Process

Figure 11:
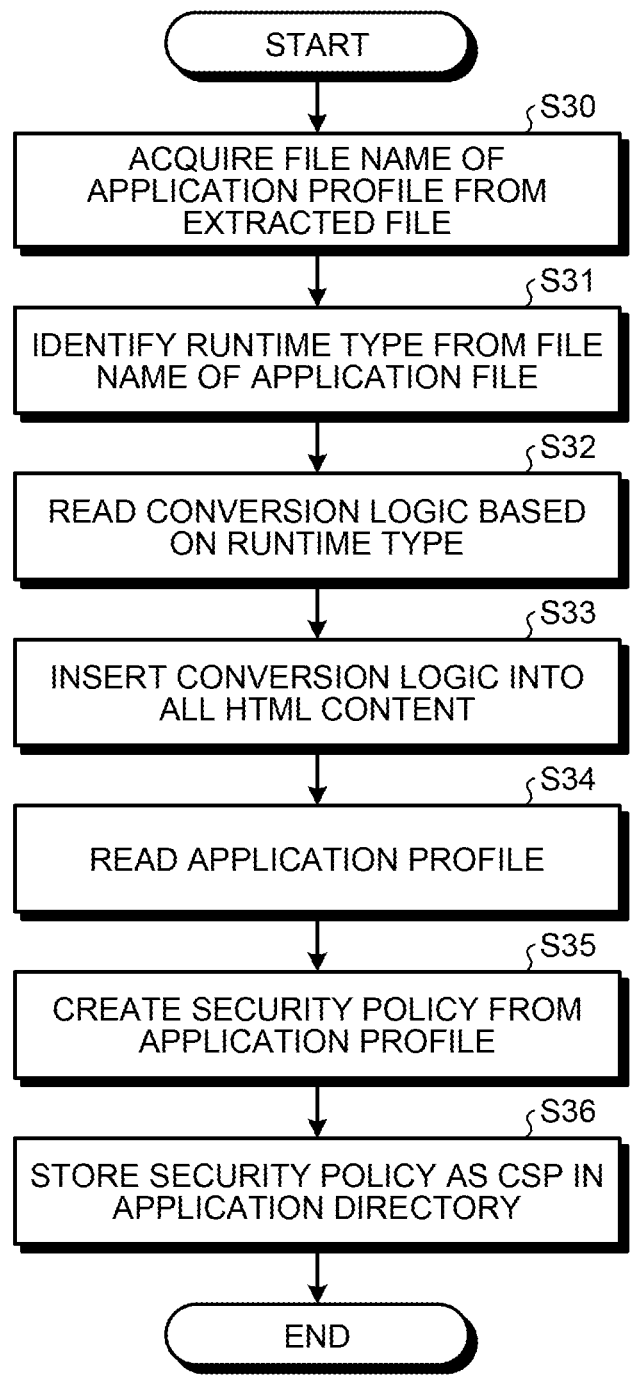
FIG. 11 is a flowchart illustrating the flow of an application conversion process according to the embodiment.

FIG. 11 is a flowchart illustrating the flow of an application conversion process according to the embodiment. Furthermore, it is assumed that the application converting unit 113 has received an application identifier and an application directory from the application extracting unit 112.

As illustrated in FIG. 11, the application converting unit 113 acquires, from the extracted file, the file name of an application profile (Step S30). For example, the application converting unit 113 acquires, based on the host information table 122, the host information from the received application identifier. Then, the application converting unit 113 acquires the file name of the application profile from the file extracted in the area that is specified by the host name 122b included in the host information and that is specified by the received application directory.

Then, the application converting unit 113 identifies the runtime type from the acquired file name of the application file (Step S31). For example, the application converting unit 113 acquires, from the conversion table 124, the profile file name 124b that matches the acquired file name of the application profile. Then, the application converting unit 113 acquires, from the conversion table 124, the runtime type 124a that is associated with the acquired profile file name 124b.

Then, the application converting unit 113 reads, based on the runtime type, a conversion logic (Step S32). For example, the application converting unit 113 reads, from the conversion table 124, the API glue script 124d that is associated with the identified runtime type.

Then, the application converting unit 113 inserts the conversion logic into all HTML content of the extracted file (Step S33). For example, the application converting unit 113 adds the API glue script 124d to each of the HTML content of the extracted file.

Then, the application converting unit 113 reads the application profile (Step S34) and creates a security policy (function restriction information) from the application profile (Step S35). For example, the application converting unit 113 reads, from the conversion table 124, the profile format 124c and the security policy position 124e that are associated with the runtime type 124a. Then, the application converting unit 113 analyzes the read application profile by using the profile format 124c. Then, based on the result of the analysis, the application converting unit 113 creates a security policy for the position that is indicated by the security policy position 124e.

Then, the application converting unit 113 stores, in the application directory, the created security policy as a CSP (Step S36). Then, the application converting unit 113 ends the application conversion process.

Consequently, the application converting unit 113 can convert applications each having a different function of an execution platform (runtime) that differs for each packaged application can be executed on each of the web browsers 41.

Flowchart of the Application Publishing Process

Figure 12:
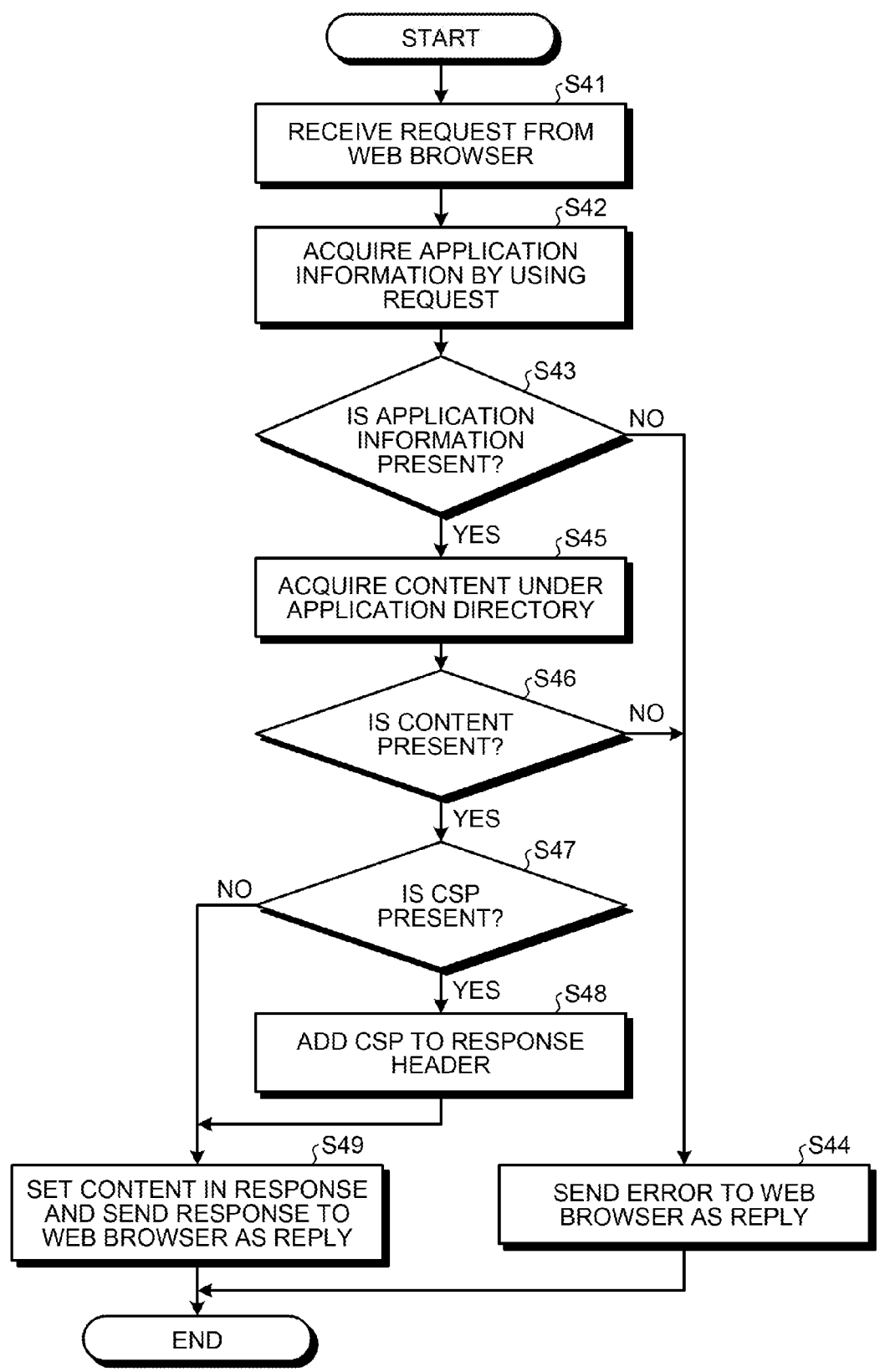
FIG. 12 is a flowchart illustrating the flow of an application publishing process according to the embodiment.

FIG. 12 is a flowchart illustrating the flow of an application publishing process according to the embodiment.

As illustrated in FIG. 12, the application publishing unit 114 receives a request from the web browser 41 (Step S41). The application publishing unit 114 acquires application information by using the received request (Step S42). For example, the application publishing unit 114 extracts a host name and a file path from the received request. Then, the application publishing unit 114 acquires, from the host information table 122, the application identifier 122c by using the extracted host name. Then, the application publishing unit 114 acquires, from the application information table 121, the subject application information by using the acquired application identifier 122c and the extracted file path.

The application publishing unit 114 determines whether the application information is present (Step S43). If the application publishing unit 114 determines that no application information is present (No at Step S43), the application publishing unit 114 sends an error to the web browser 41 as a reply (Step S44). Then, the application publishing unit 114 ends the application publishing process.

In contrast, if the application publishing unit 114 determines that application information is present (Yes at Step S43), the application publishing unit 114 acquires the content under the application directory 121b that is included in the application information (Step S45). The application publishing unit 114 determines whether the content is present (Step S46). If the application publishing unit 114 determines that no content is present (No at Step S46), the application publishing unit 114 proceeds to Step S44 in order to send an error as a reply.

In contrast, if the application publishing unit 114 determines that the content is present (Yes at Step S46), the application publishing unit 114 determines whether a CSP is present under the application directory (Step S47). If the application publishing unit 114 determines that a CSP is present under the application directory (Yes at Step S47), the application publishing unit 114 adds the CSP to the response header (Step S48). Then, the application publishing unit 114 proceeds to Step S49.

In contrast, if the application publishing unit 114 determines that no CSP is present under the application directory (No at Step S47), the application publishing unit 114 proceeds to Step S49.

At Step S49, the application publishing unit 114 sets the content in a response and sends the response to the web browser 41 as a reply (Step S49). Then, the application publishing unit 114 ends the application publishing process.

Consequently, because a desired application (content) is provided in a different host, the web browser 41 can separate the data that is used by the subject application. Furthermore, by receiving a desired application in which the function of the runtime that is the execution platform of a packaged application has been converted to a function for the web browser 41, the web browser 41 can execute the packaged application in the web browser 41.

Specific Example of the Application Providing Process

Figure 13A:
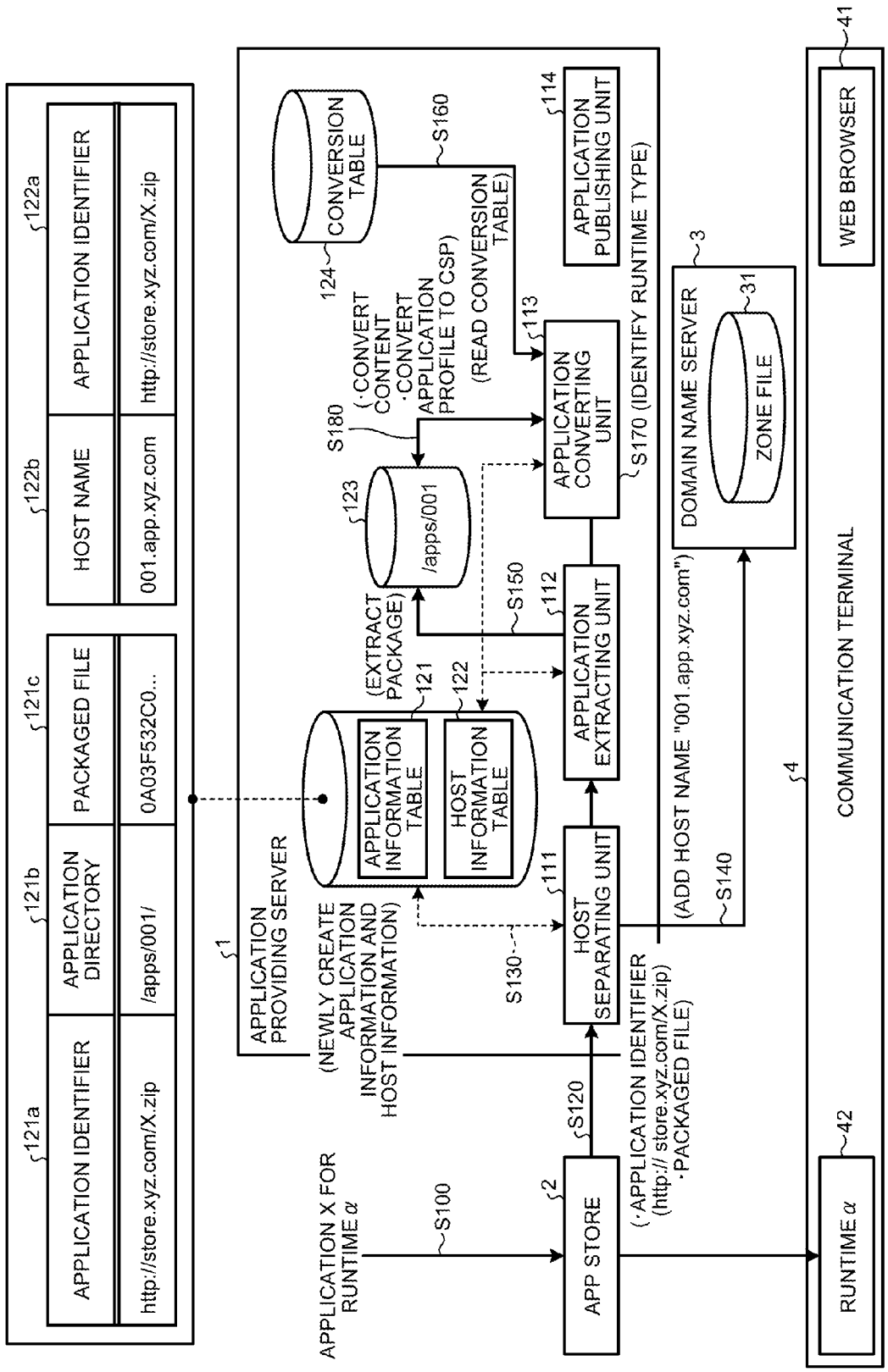
FIG. 13A is a schematic diagram illustrating a specific example of the application providing process according to the embodiment.
Figure 15:
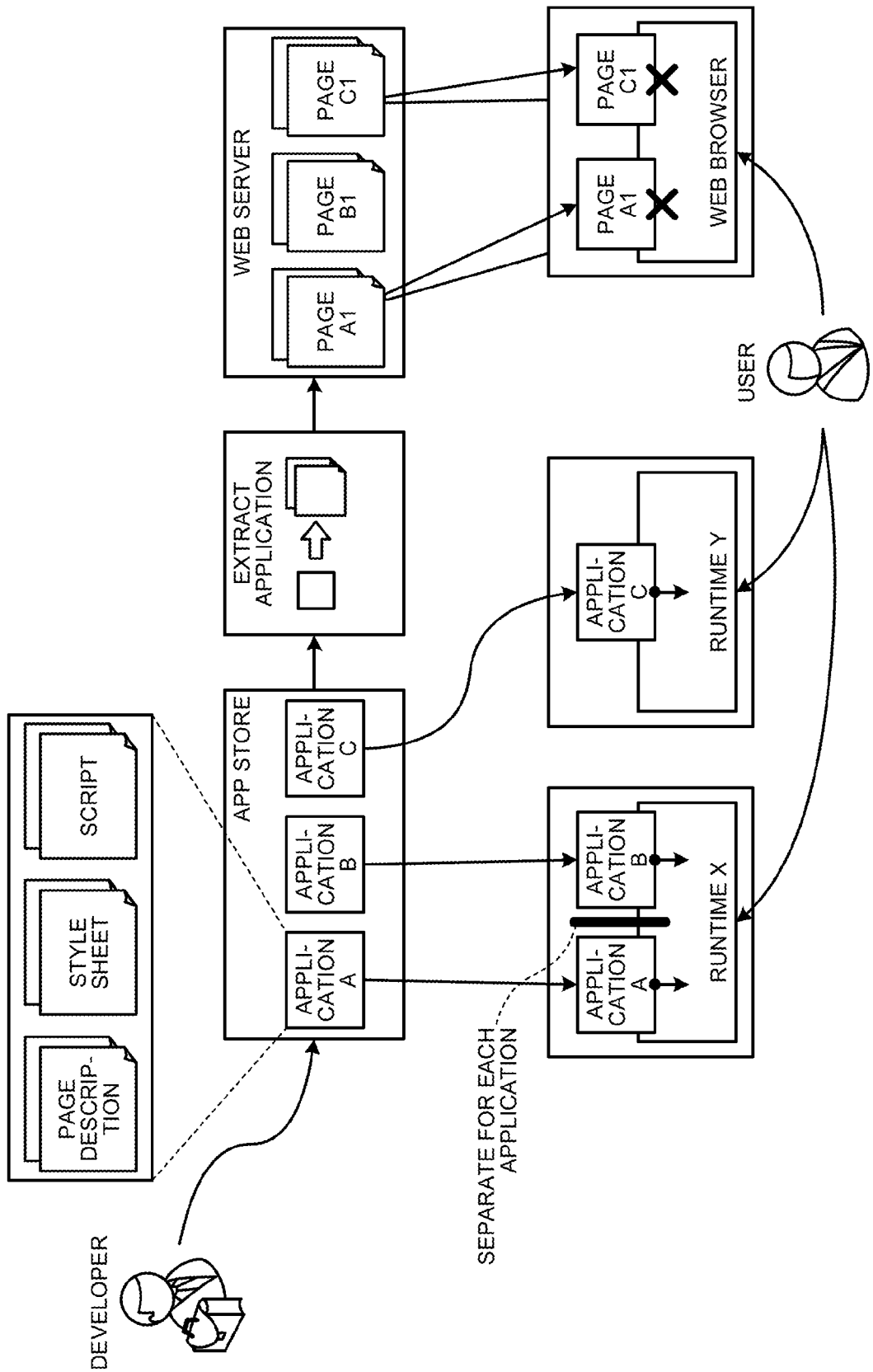
FIG. 15 is a schematic diagram illustrating a problem of not securely executing applications when a web browser executes packaged applications.

FIGS. 13A and 13B are schematic diagrams each illustrating a specific example of the application providing process according to the embodiment. FIG. 13A illustrates a specific example in which the application providing process extracts an application X for the runtime α, converts the extracted application to the application for the web browser 41, and publishes the application X in the dedicated host. The application X is a packaged application. FIG. 13B illustrates a specific example in which the application providing process receives a request including the URL for the application X from the web browser 41 and provides the web browser 41 with the application X that has been converted for the web browser 41. Furthermore, in FIG. 13A, it is assumed that the application information on the application X and the host information are not present. It is assumed that the application identifier of the application X is "http://store.xyz.com/X.zip". It is assumed that the host name to be decided is "001.app.xyz.com".

As illustrated in FIG. 13A, the application X for the runtime α is registered in the app store 2 by, for example, a developer (Step S100).

The host separating unit 111 in the application providing server 1 receives, from the app store 2, the application identifier and the packaged file of the application X (Step S120). Then, because the application information associated with the application identifier of the application X is not present, the host separating unit 111 newly creates the subject application information. The host separating unit 111 stores the newly created application information in the application information table 121. Because the host information associated with the application identifier of the application X is not present, the host separating unit 111 decides the host name associated with the application identifier of the application X and then stores the host information including the decided host name in the host information table 122 (Step S130).

Here, the application information, such as "http://store.xyz.com/X.zip" as the application identifier 121a, "apps/001/" as the application directory 121b, and "0A03F532C0 . . . " as the packaged file 121c, is stored in the application information table 121. Furthermore, the host information, such as "001.app.xyz.com" as the host name 122b and "http://store.xyz.com/X.zip" as the application identifier 122c, is stored in the host information table 122.

Then, the host separating unit 111 notifies the domain name server 3 of the decided host name (Step S140). In this case, "001.app.xyz.com" is notified as the decided host name.

Then, the application extracting unit 112 extracts the packaged file of the application X in the area specified from the decided host name and the application directory 121b included in the application information (Step S150). Here, the packaged file of the application X is extracted under the application directory 121b "apps/001/" of the host with the host name 1212a of "001.app.xyz.com" in the extracted file storage area 123.

Then, the application converting unit 113 reads the conversion table 124 (Step S160). The application converting unit 113 identifies the runtime type based on the file name of the application profile included in the extracted file and based on the conversion table 124 (Step S170).

Then, the application converting unit 113 acquires, based on the read conversion table 124, the API glue script that is associated with the identified runtime type. The application converting unit 113 adds the acquired API glue script to the extracted file (content) and converts the application X. In addition, the application converting unit 113 converts the application profile to the CSP (Step S180). As the result, the application providing server 1 publishes the application X in the dedicated host (host name: "001.app.xyz.com").

As illustrated in FIG. 13B, the web browser 41 sends a request including the URL for the application X to the application providing server 1 (Step S200). Here, it is assumed that the URL for the application X is "http://001.app.xyz.com/".

Then, the application publishing unit 114 in the application providing server 1 acquires the subject content from the extracted file storage area 123 by using the URL included in the request (Step S210). Here, the application publishing unit 114 extracts the host name "001.app.xyz.com" from the URL "http://001.app.xyz.com/" included in the request and acquires, by using the extracted host name as a key, the application identifier 122*c* "http://store.xyz.com/X.zip" from the host information table 122. The application publishing unit 114 acquires, by using the acquired application identifier 122*c* as a key, the application directory 121*b* "/apps/001/" from the application information table 121. The application publishing unit 114 acquires the subject content (/apps/001/index.html) from the area specified from the host name "001.app.xyz.com" and the application directory 121*b* "/apps/001/".

In addition, by using the URL included in the request, the application publishing unit 114 acquires the subject CSP file from the extracted file storage area 123 (Step S220). Here, the application publishing unit 114 acquires the subject CSP file (/apps/001/csp.data) from the area specified from the host name "001.app.xyz.com" and the application directory 121*b* "/apps/001/".

Then, the application publishing unit 114 sets the subject content in the response, adds the subject CSP file to the response header, and sends the response to the web browser 41 as a reply (Step S230). Consequently, because, for the returned content, the origin is separated from another packaged application, the web browser 41 can securely execute the returned content. Namely, because the data used by the returned content, such as a document object model (DOM), a cookie, web storage, or the like, is not accessed from the other application, the web browser 41 can securely execute an operation.

Advantage of the Embodiment

According to the embodiment described above, after registering a packaged application, the application providing server 1 extracts the packaged application such that the packaged application is separated from other packaged applications for each host. The application providing server 1 converts the extracted content to the content for a web browser in accordance with the execution platform of the packaged application. When the application providing server 1 receives an application acquisition request including a host name from the web browser 41, the application providing server 1 provides the content belonging to the host indicated by the host name that is included in the subject application acquisition request. With this configuration, the application providing server 1 can separate the origin by separating the host for each packaged application and can securely execute each of the packaged applications on the web browser 41.

Furthermore, according to the embodiment described above, the application providing server 1 converts the extracted content to the content for the web browser 41 such that the function provided by the execution platform of the packaged application can be used. With this configuration, when the application providing server 1 allows the packaged application to be executed in the web browser 41, the application providing server 1 can execute the same function as that executed in the execution platform of the subject packaged application.

Furthermore, according to the embodiment described above, the application providing server 1 identifies, based on the application profile included in the content that is the result of the extract of the packaged application, the type of the execution platform of the packaged application. The application providing server 1 converts the extracted content to the content for the web browser 41 in accordance with the conversion logic that is associated with the identified type. With this configuration, by converting the content extracted by using the conversion logic associated with the execution platform of the packaged application to the content for the web browser 41, the application providing server 1 can absorb the functional difference of the execution platform of the packaged application.

Furthermore, according to the embodiment described above, the application providing server 1 further analyzes the application profile in the form associated with the subject application profile. The application providing server 1 converts, based on the result of the analysis, the function restriction information included in the application profile to the function restriction information that can be recognized by the web browser 41. With this configuration, by converting the function restriction information associated with the execution platform of the packaged application to the information for the web browser 41, the application providing server 1 can absorb the difference of the function restriction information on the execution platform of the packaged application.

Furthermore, according to the embodiment described above, the application providing server 1 extracts each of the packaged applications by using a separate host for each tenant that manages the packaged application. With this configuration, by separating the hosts for each tenant, the application providing server 1 can separate the origin for each tenant and thus securely execute, on the web browser 41, each of the packaged applications in each tenant.

Program, Etc.

In the embodiment described above, it has been described that the host separating unit 111 separates a host for each packaged application or separates a host for each tenant that manages a packaged application. However, the host separating unit 111 is not limited thereto and may also separate a host for each user who uses a packaged application. In such a case, for example, the application identifier of the packaged application is associated with the user name and, when the host separating unit 111 receives the application identifier of the packaged application and a packaged file from the app store 2, the host separating unit 111 may separate the host for each application identifier of the packaged application. Consequently, the host separating unit 111 can restrict the access to data of the packaged application executed by another user.

Furthermore, in the embodiment described above, it has been described that, when the host separating unit 111 receives an application identifier of a packaged application and a packaged file from the app store 2, the host separating unit 111 separates a host for each application identifier of the packaged application. However, the host separating unit 111 is not limited thereto. If the application identifier of the packaged application is included in the packaged file, when the host separating unit 111 receives the packaged file, the host separating unit 111 may separate the host for each application identifier of the packaged application that is included in the packaged file.

The components of each device illustrated in the drawings are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the host separating unit 111 and the application extracting unit 112 may also be integrated as a single unit. The application converting unit 113 may also be separated into a first converting unit that performs the flattening of the functional difference and a second converting unit that converts the function restriction information. Furthermore, the storing unit 12 may also be connected via a network as an external device of the application providing server 1.

Various kinds of processing described in the above embodiment can be implemented by executing programs prepared in advance for a computer such as a personal computer or a workstation. Accordingly, in the following, an example of a computer that executes an application providing program having the same function as that performed by the application providing server 1 illustrated in FIG. 2 will be described. FIG. 14 is a block diagram illustrating an example of a computer that executes an application providing program.

As illustrated in FIG. 14, a computer 200 includes a CPU 203 that executes various kinds arithmetic processing, an input device 215 that receives an input of data from a user, and a display control unit 207 that controls a display device 209. Furthermore, the computer 200 includes a drive device 213 that reads a program or the like from a storage medium and a communication control unit 217 that sends and receives data to and from another computer via the network. Furthermore, the computer 200 includes a memory 201 that temporarily stores therein various kinds of information and an HDD 205. Then, the memory 201, the CPU 203, the HDD 205, the display control unit 207, the drive device 213, the input device 215, and the communication control unit 217 are connected by a bus 219.

The drive device 213 is, for example, a device for a removable disk 211. The HDD 205 stores therein an application providing program 205a and an application providing process related information 205b.

The CPU 203 reads the application providing program 205a, loads the read program in the memory 201, and executes the loaded program as a process. This process corresponds to each of the functioning units in the application providing server 1. The application providing process related information 205b corresponds to the application information table 121, the host information table 122, the extracted file storage area 123, and the conversion table 124. Then, for example, the removable disk 211 stores therein each of the pieces of information, such as the application providing program 205a or the like.

Furthermore, the application providing program 205a does not need to be stored in the HDD 205 from the beginning. For example, the program is stored in a "portable physical medium", such as a flexible disk (FD), a CD-ROM, a DVD disk, a magneto-optic disk, an IC CARD, or the like, that is to be inserted into the computer 200. Alternatively, the program is stored in an external storage device connected via the communication control unit 217. Then, the computer 200 may also read and execute the application providing program 205a from the portable physical medium.

According to an aspect of an embodiment of the application providing method disclosed in the present invention, a web server can securely execute a packaged application on a web browser.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An application providing method comprising:
 determining a host name uniquely for a packaged application, which is registered in an app store and in which files included in an application are packaged, by a processor of a web server;
 extracting content from the packaged application;
 identifying, based on information about the application included in the extracted content, a type of an execution platform of the packaged application, by the processor;
 converting, in accordance with the execution platform of the packaged application,
 the extracted content to content for a web browser operating on a terminal, the converted content being executed on the web browser and being stored in an area of a storing unit, the area being specified based on the host name, by the processor; and
 providing, when an application acquisition request including a host name is received from the web browser, the content for the web browser,
 the content being acquired from the area based on the host name included in the application acquisition request, to the web browser, by the processor.

2. The application providing method according to claim 1, wherein the converting includes converting the extracted content to the content for the web browser such that function provided by the execution platform of the packaged application is used, by the processor.

3. The application providing method according to claim 1, wherein the converting includes
 converting, in accordance with a conversion logic associated with the identified type, the extracted content to the content for the web browser, by the processor.

4. The application providing method according to claim 3, wherein the converting includes
 analyzing the information about the application by a format associated with the identified type, by the processor, and
 converting function restriction information that is included in the information about the application and is identified based on a result of the analyzing to function restriction information that is recognized by the web browser, by the processor.

5. The application providing method according to claim 1, wherein the determining includes determining a host name uniquely for a plurality of packaged applications that are identified by a same identifier and are managed by a tenant, by the processor.

6. A non-transitory computer-readable recording medium storing an application providing program that causes a computer to execute a process comprising:
 determining a host name uniquely for a packaged application, which is registered in an app store and in which files included in an application are packaged;
 extracting content from the packaged application;
 identifying, based on information about the application included in the extracted content, a type of an execution platform of the packaged application;
 converting, in accordance with the execution platform of the packaged application,
 the extracted content to content for a web browser operating on a terminal, the converted content being executed on the web browser and being stored in an area of a storing unit, the area being specified based on the host name; and providing, when an application acquisition request including a host name is received from the web browser, the content for the web browser,
the content-being acquired from the area based on the host name included in the application acquisition request, to the web browser.

7. An application providing server comprising:

a processor configured to execute a process including:

determining a host name uniquely for a packaged application, which is registered in an app store and in which files included in an application are packaged;

extracting content from the packaged application;

identifying, based on information about the application included in the extracted content, a type of an execution platform of the packaged application;

converting, in accordance with the execution platform of the packaged application, the extracted content to content for a web browser operating on a terminal, the converted content being executed on the web browser and being stored in an area of a storing unit, the area being specified based on the host name; and providing, when an application acquisition request including a host name is received from the web browser, the content for the web browser, the content-being acquired from the area based on the host name included in the application acquisition request, to the web browser.

* * * * *